US009253199B2

(12) United States Patent
Engert

(10) Patent No.: US 9,253,199 B2
(45) Date of Patent: Feb. 2, 2016

(54) VERIFYING AUTHENTICITY OF A SENDER OF AN ELECTRONIC MESSAGE SENT TO A RECIPIENT USING MESSAGE SALT

(75) Inventor: Kai Wolfgang Engert, Frankfurt (DE)

(73) Assignee: Red Hat, Inc., Raleigh, NC (US)

( * ) Notice: Subject to any disclaimer, the term of this patent is extended or adjusted under 35 U.S.C. 154(b) by 998 days.

(21) Appl. No.: 12/878,470

(22) Filed: Sep. 9, 2010

(65) Prior Publication Data

US 2012/0066498 A1    Mar. 15, 2012

(51) Int. Cl.
*H04L 9/32* (2006.01)
*H04L 29/06* (2006.01)
*G06F 21/51* (2013.01)
*H04L 12/58* (2006.01)

(52) U.S. Cl.
CPC .............. *H04L 63/126* (2013.01); *G06F 21/51* (2013.01); *H04L 9/3236* (2013.01); *H04L 51/12* (2013.01); *H04L 12/58* (2013.01); *H04L 63/068* (2013.01); *H04L 2209/60* (2013.01)

(58) Field of Classification Search
CPC ... H04L 12/58; H04L 2209/60; H04L 9/3236; H04L 63/123; H04L 63/126
USPC ........................................................ 713/170
See application file for complete search history.

(56) References Cited

U.S. PATENT DOCUMENTS

| | | | |
|---|---|---|---|
| 6,986,049 B2 * | 1/2006 | Delany .......................... 713/176 |
| 8,214,437 B1 * | 7/2012 | Alspector et al. ............. 709/206 |
| 2005/0278533 A1 * | 12/2005 | Mayer ........................... 713/170 |
| 2007/0143475 A1 * | 6/2007 | Daigle ........................... 709/225 |
| 2008/0072294 A1 * | 3/2008 | Chatterjee ......................... 726/4 |
| 2008/0282344 A1 * | 11/2008 | Shuster ............................. 726/21 |
| 2008/0320591 A1 * | 12/2008 | Fenton et al. .................... 726/22 |
| 2009/0044013 A1 * | 2/2009 | Zhu et al. ....................... 713/170 |
| 2010/0115040 A1 * | 5/2010 | Sargent et al. ................. 709/206 |

OTHER PUBLICATIONS

Bellare et al. "Keying Hash Functions for Message Authentication" Pub. Date: Jun. 1996, pp. 1-19.*

* cited by examiner

*Primary Examiner* — Krista Zele
*Assistant Examiner* — James Forman
(74) *Attorney, Agent, or Firm* — Lowenstein Sandler LLP

(57) ABSTRACT

A server receives a verification request sent by a client associated with a recipient of an electronic message to verify authenticity of a sender of the electronic message, where the verification request comprises message data of the electronic message and a salt hash value. The server identifies a key for the sender for generating a salt hash value and generates the salt hash value using the salt key and the message data. The server determines whether the generated salt hash value matches the salt hash value received in the verification request and sends a result to the client based on the determination of whether the salt hash values match.

15 Claims, 8 Drawing Sheets

VERIFYING AUTHENTICITY OF A SENDER OF AN ELECTRONIC MESSAGE SENT TO A RECIPIENT USING MESSAGE SALT

TECHNICAL FIELD

Embodiments of the present invention relate to messaging services. Specifically, the embodiments of the present invention relate to verifying the authenticity of a sender of an electronic message sent to a recipient using message salt.

BACKGROUND

'Spam' is the use of electronic messaging systems to send unsolicited bulk messages indiscriminately. 'Email spoofing' is email activity where a user alters properties of an email message, such as the 'From' and 'Reply-To' fields in a message header to make the email appear to be from someone other than the actual sender. Thus, an email message can appear to be sent from the address indicated in the From field, but is actually sent from another source. Email spoofing is commonly used for Spam email and phishing to hide the origin of an email message. 'Phishing emails' are email messages purporting to be from a trusted entity that attempt to deceive users into providing account or identify information. For example, an email purports to be from a trusted entity, such as an online auction web service provider eBay, Inc., and the email states that the user needs to provide information, such as credit card numbers, to correct an alleged problem with a user account.

Traditionally, email message filters have been used to help reduce phishing emails and Spam received from email spoofing. Typically, the email message filters flag received email messages based on matching a regular expression, keywords in the message body, or the e-mail address of the sender of the message. Some more advanced email message filters, particularly anti-spam filters, have used statistical approaches to reduce email message Spam received by a user. These conventional approaches, however, often prove to be unreliable and frequently mislabel legitimate email messages as spam. Consequently, users are prevented from receiving messages from authorized senders. Other traditional spam filtering solutions require email transport servers which authenticate each other. However, such implementations can be expensive and require changing existing email transport servers. Another conventional solution requires client support for cryptographic signatures and special software to allow users to 'sign' email messages. Email signing, however, has not been universally accepted. Thus, conventional email spam filtering solutions that have been focused on the recipient-side to flag email messages as potential spam are untrustworthy as admissible email messages are often mistakenly flagged as spam. Moreover, other solutions can be costly and require changes to the existing hardware.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for verifying the authenticity of a sender of an electronic message sent to a recipient using a salt hash value (message salt). A server receives a verification request sent by a client associated with a recipient of an electronic message to verify authenticity of a sender of the electronic message, where the verification request comprises message data of the electronic message and a salt hash value. The server identifies a key for the sender for generating a salt hash value and generates the salt hash value using the salt key and the message data. The server determines whether the generated salt hash value matches the salt hash value received in the verification request and sends a result to the client based on the determination of whether the salt hash values match.

Conventional email spam filtering solutions aimed at preventing email spoofing and phishing emails are focused on the recipient-side to flag email messages as potential spam, but are untrustworthy as legitimate email messages are often mistakenly flagged as spam. Moreover, other traditional solutions can be costly and require major changes to the existing hardware. Embodiments of the present invention provide a reliable mechanism for authenticating a message sender that is inexpensive and does not require changes to hardware. Embodiments of the present invention provide a compatible and optional extension to electronic messaging systems that can be implemented on top of (and in parallel to) existing server infrastructure, in order to provide message sender validation, reporting and detecting abuse of messaging accounts, and automatic filtering of messages based on invalid sender identification.

Figure 1:
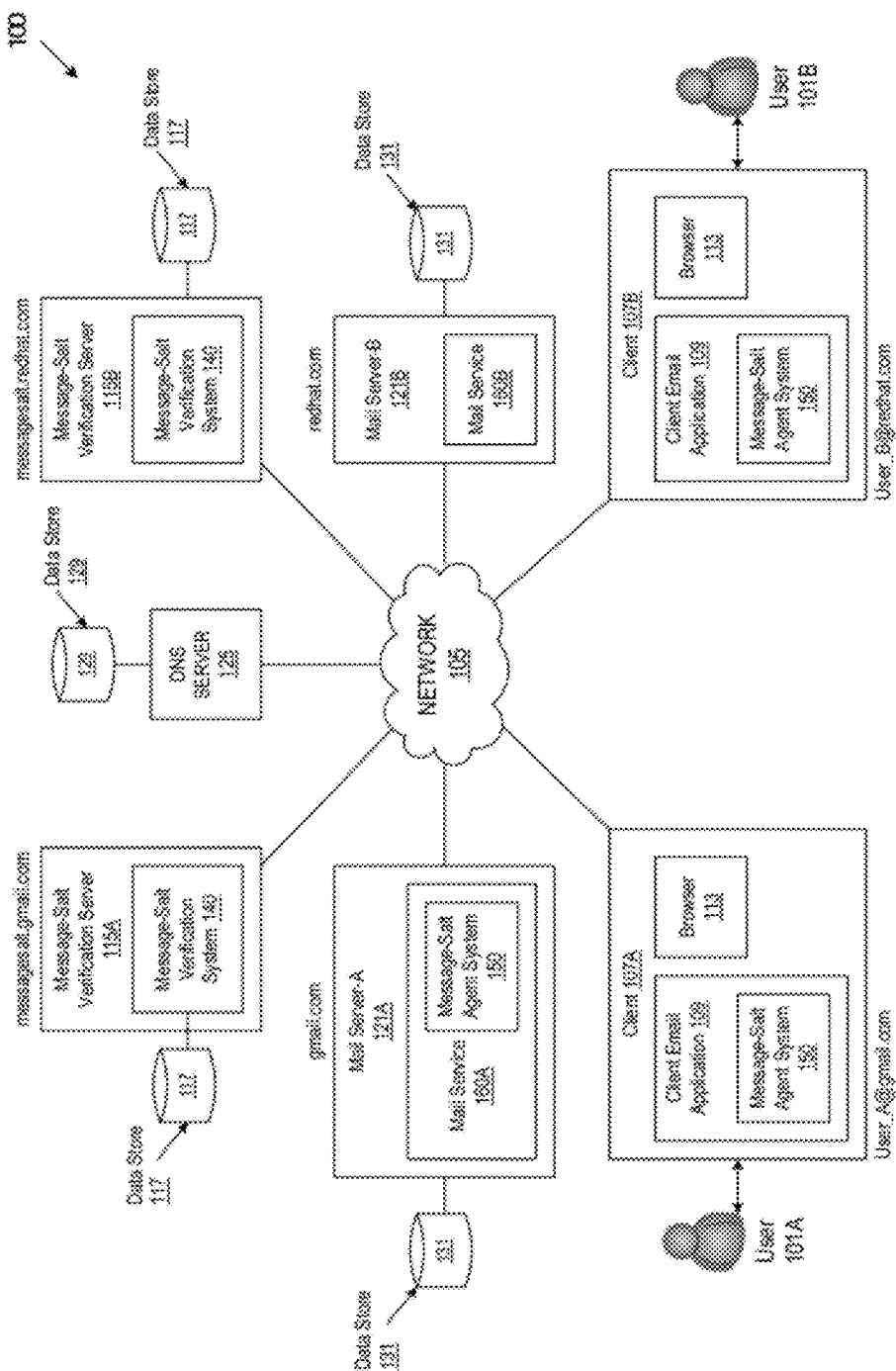
FIG. 1 is an exemplary network architecture in which embodiments of the present invention may operate.

FIG. 1 is an exemplary network architecture 100 in which embodiments of the present invention can be implemented. Embodiments of the invention are directed to a method and system for verifying the authenticity of a sender of an electronic message sent to a recipient using message salt. Examples of electronic messages can include, and are not limited to, electronic mail messages (email messages), instant messages, newsgroup messages, forum messages, mobile text messages, online gaming messages, social networking messages, blog messages, and other similar electronic messages. Examples of electronic messaging service providers can include, and are not limited to, service providers that provide email services, webmail services, instant messaging services, newsgroup services, forum services, mobile services, online gaming services, social networking services, blog services, and other similar services. Electronic messaging service providers can host one or more servers (e.g., message servers) for providing electronic messaging services. For brevity and simplicity, email message, email service provider, email provider, mail server, mail service, mail domain, and client email application are used as examples throughout this document.

The architecture 100 includes one or more message servers (e.g., mail servers 121A,B), message-salt verification servers 115A,B, message salt protocol registration servers (e.g., DNS servers 125), and clients 107A,B that are accessible to one another using network 105. A message server (e.g., mail server 121A,B), a message-salt verification server 115A,B, and a message salt protocol registration server (e.g., DNS server 125) can be any type of computing device including server computers, desktop computers, laptop computers, gateway computers, or similar computing device. A client 107A,B can be a client computer such as desktop computers, laptop computers, mobile communications devices, cell phones, smart phones, hand-held computers or similar computing device, a server computer, a gateway computer, etc. An exemplary computing device is described in greater detail below in conjunction with FIG. 8. The network 105 can be a public network (e.g., Internet) or a private network (e.g., a local area network (LAN)).

Message servers, such as mail servers 121A,B, can host one or more messaging services, such as mail services 160A,B, and are maintained by message service providers, such as email providers. For example, service provider Google, Inc. can provide a free public webmail service 160A, Gmail™, hosted by a mail server 121A that has a mail domain 'gmail.com.' The mail server 121A can be one of many servers that manage the mail domain 'gmail.com.' In another example, Red Hat, Inc. can provide a mail service 160B to its employees, hosted by a mail server 121B that has a mail domain 'redhat.com.' The mail server 121B can be one of many servers that manage the mail domain 'redhat.com.'

Conventional email spam filtering solutions have been focused on the recipient-side to flag email messages as potential spam, but often mistakenly flag legitimate email messages as spam. Embodiments of the present invention add 'salt' to an electronic message on the sender-side and a client on the recipient-side can use the 'salt' in the electronic message to verify the authenticity of the sender. Additional content is known in the art as 'salt'. A message service provider, such as an email provider, can maintain its own message-salt verification server 115A,B for supporting message salt for verifying the authenticity of users 101A,B that send electronic messages. For example, Google, Inc. can provide and maintain a message-salt verification server 115A (e.g., messagesalt.gmail.com), and Red Hat, Inc. can provide and maintain a message-salt verification server 115B (e.g., messagesalt.redhat.com). A messaging service provider can register its message-salt verification server 115A,B with a server that hosts a protocol registration service, such as a domain name service (DNS) that is hosted by one or more DNS servers 125. A message salt protocol registration server (e.g., DNS server 125) can store message-salt discovery data that includes, for example, the registration information for the message-salt verification servers 115A,B in a data store 129 that is coupled to the message salt protocol registration server (e.g., DNS server 125). For example, a new 'DNS record type' with a code 'MSALT' can be introduced in DNS records to make message-salt verification servers 115A,B discoverable. A message service provider can store and maintain a key (salt key), which is used to generate the message salt, for each user account. The salt keys can be stored in a data store 131 that is coupled to a message server (e.g., mail server 121A,B) or in a data store 117 that is coupled to a message-salt verification server 115A,B.

Users 101A,B can use a client 107A,B that hosts a client messaging application, such as client email application 109 (e.g., Microsoft® Outlook®, Mozilla® Thunderbird®), to generate and receive electronic messages. A client email application 109 can include a message-salt agent system 150 that is configured to use a key for a sender for generating a salt hash value (message salt), and include the salt hash value in an electronic message to be sent to a recipient user 101A,B. A key for a sender for generating a salt hash value in herein referred to as a salt key. In addition, a recipient 101A,B can use a client 107A,B that hosts a message-salt agent system 150 to receive an electronic message, to detect a salt hash value (message salt) in the electronic message, and to provide the salt hash value to a message-salt verification server 115A,B that is associated with the sender to verify the authenticity of the sender. In another example, a user 101A,B can use a browser 113 hosted by a client 107A,B, to access a message service, such as a webmail service (e.g., Gmail™ webmail service 160A), to generate and receive electronic messages. A message service, such as webmail service 160A hosted by a mail server 121A, can include a message-salt agent system 150 that is configured to use the key for a sender for generating the salt hash value (message salt) and include the salt hash value in the electronic message to be sent to a recipient user 101A,B. A recipient 101A,B can use a browser 113 to access a message service, such as webmail service 160A, that includes a message-salt agent system 150 to receive an electronic message, to detect a salt hash value in the electronic message, and to provide the salt hash value to a message-salt verification server 115A,B that is associated with the sender to verify the authenticity of the sender.

For example, user 101A has a Gmail™ webmail account, such as User_A@gmail.com. Google Inc. has assigned a salt key for the user 101A and stores it in a data store 117,131. User 101A can use a browser 113 or an email client application 109 hosted by client 107A to generate an email message to send to recipient user 101B. The message-salt agent system 150 (e.g., included in the email application 109, included in the Gmail™ webmail service 160A) can be configured to use the salt key assigned to the user 101A to generate a salt hash value, include it in the email message (e.g., in the headers (i.e. RFC 5322) of the email message), and send the email message to the recipient 101B. One embodiment of a method for creating an electronic message containing message salt (e.g., a salt hash value) is described in greater detail below in conjunction with FIG. 4.

User 101B has a Red Hat email account, such as User_B@redhat.com. Recipient 101B can use a browser 113 or a email client application 109 hosted by client 107B to receive the email message from sender 101A. The message-salt agent system 150 can detect the salt hash value in the email message, and provide the salt hash value to a message-salt verification server 115A that is associated with the sender to verify the authenticity of the sender 101A. The message-salt agent system 150 can generate a verification request for the email message and send it to the message-salt verification server that manages the mail domain of the sender 101A, such as message-salt verification server 115A (messagesalt.gmail.com), which manages the mail domain of sender 101A.

Each message-salt verification server 115A,B manages one or more message domains, such as one or more mail domains. The DNS server 125 can store message-salt discovery data (e.g., 'MSALT' type DNS records) in the data store 129 that maps message-salt verification servers 115A,B to corresponding message domains that they manage. For example, the message-salt verification data maps message-salt verification server 115A (messagesalt.gmail.com) to mail domain 'gmail.com' and message-salt verification server 115B (messagesalt.redhat.com) to mail domain 'redhat.com.' When a message-salt agent system 150, such as hosted by client 107B, generates a verification request, it can query the DNS server 125 to determine which message-salt verification server 115A,B to send the verification request to. The DNS server 125 can identify the message-salt verification server that manages the message domain of the sender which is to be authenticated, and the message-salt agent system 150 can send the verification request to the identified message-salt verification server. For example, the DNS server 125 identifies that for sender User_A@gmail.com, the message-salt verification server 115A (messagesalt.gmail.com) manages the mail domain 'gmail.com'.

The message-salt agent system 150, such as hosted by client 107B, can send the verification request to the sender message-salt verification server 115A (messagesalt.gmail.com). A message-salt verification server that manages a message domain of a sender can also be referred to as a 'sender message-salt verification server.' A message-salt verification server that manages a message domain of a recipient can also be referred to as a 'recipient message-salt verification server.' In one embodiment, a recipient message-salt verification server acts as a proxy ("proxy server") for the recipient client, and the message-salt agent system 150 (e.g., hosted by client 107B), sends the verification request to the recipient message-salt verification server, which then forwards the verification request to the sender message-salt verification server.

For example, the message-salt agent system 150, hosted by recipient client 107B, can send the verification request to its recipient message-salt verification server 115B (messagesalt.redhat.com), and then the recipient message-salt verification server 115B (messagesalt.redhat.com) forwards the verification request to the sender message-salt verification server 115A (messagesalt.gmail.com). To help prevent an attacker from pretending false positive verification results, a connection to a message-salt verification server 115A,B can use an SSL connection (or another secure transport), and can require a message-salt verification server 115A,B to have a valid X.509 server certificate (or use some other form of secure authentication) to authenticate itself with another message-salt verification server 115A,B. In one embodiment, both a "proxy server" and a message-salt verification server should own a valid X.509 cert (or some other form of secure identification) to help prevent denial-of-service-attacks caused by unknown sources that send masses of verification requests, and to make sure that incoming spam reports originate from a trustworthy origin.

A message-salt verification server 115A,B can host a message-salt verification system 140 for receiving a verification request and determining whether a sender of an electronic message is an authenticated (trusted) sender. The verification request can include the salt hash value which the sender included in the electronic message. A message-salt verification system 140 hosted by the sender message-salt verification server can also be referred to as a 'sender message-salt verification system 140.' A message-salt verification system 140 hosted by the recipient message-salt verification server can also be referred to as a 'recipient message-salt verification system 140.' The sender message-salt verification system 140 can receive a verification request and can use the salt key assigned to the sender that is stored in a data store 117,131 to generate a salt hash value (message salt). One embodiment of a method for processing a verification request to determine whether a sender of an electronic message is an authenticated sender is described in greater detail below in conjunction with FIG. 6.

The message-salt verification system 140 can determine whether the generated salt hash value matches the salt hash value in the verification request and can send a verification result to the requesting message-salt agent system 150, such as recipient client 107B. In one embodiment, a recipient message-salt verification server acts as a proxy for the recipient client, and the sender message-salt verification system 140 sends the verification result to the recipient message-salt verification server, which then forwards the verification result to the recipient client. For example, the sender message-salt verification system 140, hosted by sender message-salt verification server 115A (messagesalt.gmail.com) can send the verification result to the recipient message-salt verification server 115B (messagesalt.redhat.com), and then the recipient message-salt verification server 115B (messagesalt.redhat.com) forwards the verification result to the recipient client 107B.

A data store can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 2:
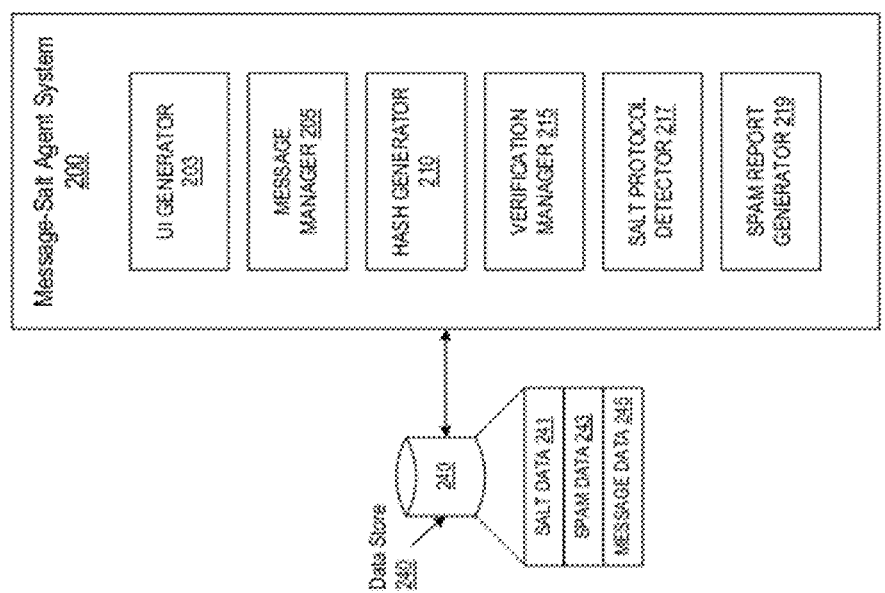
FIG. 2 is a block diagram of one embodiment of a message-salt system for using message salt for verifying the authenticity of a sender of an electronic message.

FIG. 2 is a block diagram of one embodiment of a message-salt agent system 200 for using message salt for verifying the authenticity of a sender of an electronic message. The message-salt agent system 200 may be the same as the message-salt agent system 150 hosted by a client 107A,B or a mail server 121A,B of FIG. 1. The message-salt agent system 200 can include a user interface generator 203, a message manager 205, a hash generator 210, a verification manager 215, a salt protocol detector 217, and a spam report generator 219.

A client messaging application, such as a client email application (e.g., Microsoft® Outlook®, Mozilla® Thunderbird®) and/or a message service, such as a webmail service (e.g., Gmail™ webmail service), can include a message-salt agent system 200 to generate a salt hash value (message salt) and to include the salt hash value in an electronic message to be sent to a recipient user. The message-salt agent system 200 can also receive an electronic message, detect a salt hash value in the electronic message, and provide the salt hash value to a message-salt verification server that is associated with the sender to verify the authenticity of the sender.

The message manager 205 can identify message data 245 to be used for creating an electronic message to be sent to a recipient. The message data 245 can be user input received via a user interface (UI) or data that is already stored in a data store 240, that is coupled to the message-salt agent system 200, for example, message data 245 from a previously received electronic message, an address book, etc. The UI generator 203 can generate and present a user interface to a user to receive the user input (e.g., message data 245) for creating an electronic message. The received message data 245 can be stored in the data store 240. The user interface can be a graphical user interface (GUI). The GUI can be displayed on an output device, such as a display device.

The message data 245 can include a sender identifier (e.g., a sender's FROM message address), a REPLY-TO message address, To message addresses, CC message addresses, a DATE added by the sender's client message application or message service, data for message subject and message body of the electronic message, etc., or any combination of the above, as well as other data. The message manager 205 can create the electronic message using the message data 245. The hash generator 210 can use the message subject and the message body data from the message data 245 to calculate a preliminary hash value. A preliminary hash value is a hash of the message subject and message body data of the electronic message. A preliminary hash value can also be referred to as an inner hash value. The hash generator 210 can remove whitespace characters from the message subject and the message body data and can normalize the message subject and the message body by reverting message transport encoding (e.g., MIME Quoted-Printable encoding) and generate the inner hash value. The hash generator 210 can also calculate a salt hash value (message salt) for the electronic message. The salt hash value can also be referred to as an outer hash value. The hash generator 210 can calculate the salt hash value using a key (salt key) for the sender for generating the salt hash value, the inner hash value, and at least some of the message data 245 (e.g., sender FROM message address, REPLY-TO message address, all TO and CC message addresses, a date). The hash generator 210 can use the same hash algorithm, such as SHA-256, for calculating the inner hash value and the salt hash value.

A message service provider, such as an email provider, can assign a salt key for each user account. A salt key can be known both by a user and the user's message service provider. The message service provider can generate a random key and can store and maintain the salt key in a data store that is coupled to a message server (e.g., mail server) and/or a data store that is coupled to a message-salt verification server. A user can use a user interface to configure the message-salt agent system 200 to store and maintain the user's salt key as salt data 241 in the data store 240. The salt data 241 can be stored as part of user account configuration data of a client message application, such as a client email application (e.g., Microsoft® Outlook®, Mozilla® Thunderbird®). The salt data 241 can include a sender identifier for the user, such as the user's message address (e.g., email address), and the salt key for the user. A user can configure the message-salt agent system 200 during an account registration process and/or a salt protocol detector 217 can detect that a message service provider, such as an email provider (e.g., Google Inc. and Red Hat, Inc.), support the message salt protocol described by embodiments of the invention. The salt protocol detector 217 can query a DNS server to determine whether a message service provider and/or whether a specific message domain supports the message salt protocol. For example, the salt protocol detector 217 can query a DNS server to determine whether a message-salt verification server for a particular message domain has been registered to support the message salt protocol described by embodiments of the invention. The salt protocol detector 217 can prompt a user to obtain the user's salt key from the message service provider and configure a client message application to utilize the salt key when sending electronic messages.

When the message manager 205 sends an electronic message to a recipient, the message manager 205 can add the salt hash value to the electronic message. For example, the message manager 205 can add a message header, such as an RFC 5322 email header, that includes the salt hash value to the electronic message. A message header that contains a salt hash value is also referred to as a salt header.

The message manager 205 is also responsible for handling incoming electronic messages. When the message manager 205 receives an electronic message from a sender, the message manager 205 can determine whether there is a salt hash value in the received message. For example, the message manager 205 can determine whether there is a salt header in the received message. When the message manager 205 detects a salt hash value (e.g., in a salt header) in a received electronic message, the verification manager 215 can generate and send a verification request to the message-salt verification server that is associated with the sender (sender message-salt verification server) to verify whether the sender of the received message is an authenticated (trusted) sender. In one embodiment, a recipient message-salt verification server acts as a proxy for the recipient client, and the verification manager 215 sends the verification request to the recipient message-salt verification server, which then forwards the verification request to the sender message-salt verification server. The verification manager 215 can determine the message-salt verification server that is associated with a sender of an electronic message by querying a DNS server. A verification request can include a sender identifier (e.g., a sender's FROM message address), a REPLY-TO message address, To message addresses, CC message addresses, a DATE added by the sender's client message application or message service, an inner hash value calculated by the hash generator 210 of the recipient message-salt agent system, a salt hash value which a sender included in the message to a recipient, etc., or any combination of the above, as well as other data. The hash generator 210 can use the message subject and the message body data from the received electronic message to calculate the inner hash value to be included in the verification request. The hash generator 210 can remove whitespace characters from the message subject and the message body data and can normalize the message subject and the message body by reverting message transport encoding (e.g., MIME Quoted-Printable encoding) and generate the inner hash value.

The verification manager 215 can receive a verification result from the sender message-salt verification server. In one embodiment, a recipient message-salt verification server acts as a proxy for the recipient client, and the verification manager 215 can receive a verification result from the recipient message-salt verification server. A verification result can include data that indicates whether the sender has been successfully verified or whether the sender has not been successfully verified. When a verification result indicates a sender was not successfully verified, the message manager 205 can flag the electronic message that is received from the sender as potential spam. For example, the message manager 205 can place the electronic message in a spam folder, can flag the electronic message with an indicator that the electronic message is potential spam, can display a message on a client device (e.g., client 107A,B in FIG. 1) indicating that the electronic message is potential spam when a user attempts to open the electronic message, etc. The message manager 205 can store spam data 243 in the data store 240 that indicates an electronic message is potentially spam.

There may be a scenario where a user salt key is compromised. For example, there may be a virus that reads a salt key that is stored as salt data 241 in a client message application configuration file for a user (e.g., a client email application, such as Microsoft® Outlook® and Mozilla® Thunderbird® configuration file). A spammer may access a user's key (salt key) for generating message salt and send electronic messages which, when processed for verification, can appear to be from a correctly authenticated sender. At some time, a recipient may learn that the electronic message is spam. The recipient can provide user input via a user interface generated by the UI generator 203 to cause the spam report generator 219 to create a spam report and send the spam report to the sender's message-salt verification server. For example, a recipient can click a 'report spam' icon in the user interface, select a 'report spam' menu option in the user interface, etc. The spam report can include a sender identifier (e.g., a sender's FROM message address), a REPLY-TO message address, To message addresses, CC message addresses, a DATE added by the sender's client message application or message service, data for a message subject and a message body of the electronic message, the preliminary hash value (inner hash value), salt hash value (outer hash value), etc., or any combination of the above, as well as other data. When a message-salt verification server receives a spam report, the verification server can use the preliminary hash value and salt hash value to validate the spam report, as described in greater detail below in conjunction with FIG. 3. In one embodiment, a recipient message-salt verification server acts as a proxy for the recipient client, and the spam report generator 219 sends the spam report to the recipient message-salt verification server, which then forwards the spam report to the sender message-salt verification server.

Figure 3:
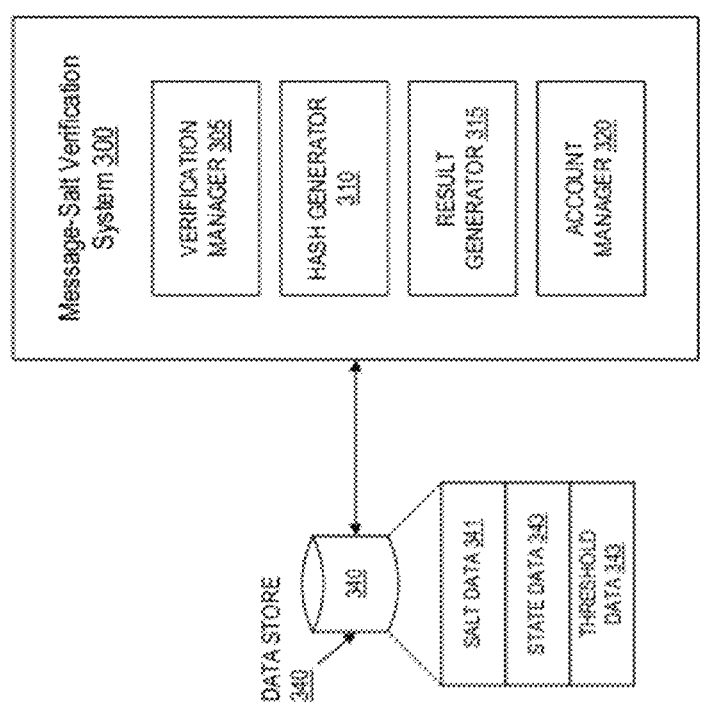
FIG. 3 is a block diagram of one embodiment of a message-salt verification system for using message salt for verifying the authenticity of a sender of an electronic message.

FIG. 3 is a block diagram of one embodiment of a message-salt verification system 300 for using message salt for verifying the authenticity of a sender of an electronic message. The message-salt verification system 300 may be the same as the message-salt verification system 140 hosted by a server 115A,B of FIG. 1. The message-salt verification system 300 can include a verification manager 305, a hash generator 310, a result generator 315, and an account manager 320. A messaging provider, such as an email provider, can assign a key for generating message salt (salt key) for each user account. The messaging provider can generate a random key and can store and maintain the salt key as part of salt data 341 that is stored in a data store 340 that is coupled to the message-salt verification system 300. The salt data 341 can include sender identifiers (e.g., message addresses, such as email addresses) for user accounts and salt keys for the user accounts.

The verification manager 305 can receive verification requests from message-salt agent systems (e.g., hosted by clients 107A,B in FIG. 1, hosted by mail server 121A in FIG. 1). A verification request can include a sender identifier (e.g., a sender's FROM message address), a REPLY-TO message address, To message addresses, CC message addresses, a DATE added by the sender's client message application or message service, an inner hash value generated by a recipient message-salt agent system, a salt hash value which a sender included in the electronic message to a recipient, etc., or any combination of the above, as well as other data. The verification manager 305 can use the sender identifier in the verification request to determine the salt key for the sender from the salt data 341 that is stored in the data store 340. The hash generator 310 can calculate a salt hash value (message salt). The hash generator 310 can calculate the salt hash value using the salt key for the sender, the inner hash value in the verification request, and at least some of the data in the verification request (e.g., sender FROM message address, REPLY-TO message address, all TO and CC message addresses, a date). The hash generator 210 can use a hash algorithm, such as SHA-256, for calculating the salt hash value.

The verification manager 305 can determine whether the salt hash value generated by the hash generator 310 matches the salt hash value in the verification request to determine whether the sender is an authenticated sender. The result generator 315 can generate and send a verification result to the requesting message-salt system (e.g., hosted by a client 107A,B in FIG. 1). A verification result can include data that indicates whether the sender has been successfully verified as a trusted sender or whether the sender has not been successfully verified. In one embodiment, a recipient message-salt verification server acts as a proxy for the recipient client, and the sender message-salt verification server sends the verification result to the recipient message-salt verification server, which then forwards the verification result to the recipient client.

The account manager 320 can store and maintain state data 343 for a sender in the data store 340. The state data 343 indicates a current state of a user account. Example states can include a good state, a potentially compromised state, etc., as well as other states. The state data 343 can include sender identifiers for message senders, the state of a sender's user account, and a current number of spam reports that are associated with a user account. The account manager 320 can receive a spam report, for example, from another message-salt verification system. The spam report can include a sender identifier (e.g., a sender's FROM message address), a REPLY-TO message address, To message addresses, CC message addresses, a DATE added by the sender's client message application or message service, data for a message subject and a message body of the electronic message, the preliminary hash value (inner hash value), salt hash value (outer hash value), etc., or any combination of the above, as well as other data. The account manager 320 can identify a user account from a sender identifier in the spam report, and can determine whether to change a state of the user account, for example, from a good state to a potentially compromised state.

When the account manager 320 receives a spam report, the account manager 320 can use the preliminary hash value and salt hash value to validate the spam report. The account manager 320 can use the hash values to determine whether the spam report belongs to the user's current salt key. For example, a recipient of an email message may not report the email message as spam until one week after the message was sent to the recipient. During the week's time that has elapsed, the account manager 320 may have received other spam reports from other recipients that pertain to the same email message, and the account manager 320 may have already assigned a new salt key to the owner of email account used to send the email message. In such a case, the account manager 320 can determine that a spam report is outdated and not valid and can ignore the spam report because the hash values in the spam report do not match hash values generated by the message-salt server using the newly assigned (current) salt key.

When the account manager 320 determines that a spam report is valid (e.g., the hash values in the spam report match hash values generated by the message-salt server using the current salt key assigned to the owner of the user account used to send the email messages, the account manager 320 can also update (increment) the current number of spam reports that are associated with the user account in the state data 343. The account manager 320 can determine whether to change the state for a sender's user account by comparing the current number of spam reports to threshold data 345 that is stored in the data store 340. The threshold data 343 indicates a number of spam reports than can be associated with a particular user account before the account manager 320 can change the state of a user account. The threshold data 343 can be a user-defined threshold. For example, the threshold data 343 can indicate a threshold value of three spam reports for User_A@gmail.com, the current number of spam reports is three, the account manager 320 receives a new spam report, increments the current number of spam reports to four, and determines that the threshold has been exceeded. The threshold data 343 can include a time parameter. For example, the threshold data 343 can indicate a threshold value of three spam reports within a 24-hour time period for User_A@gmail.com, the current number of spam reports is three, the account manager 320 receives a new spam report, increments the current number of spam reports to four, but determines that the first three spam reports were received last four days ago, and determines that the threshold has not been exceeded.

When the account manager 320 determines that, for example, a threshold has been exceeded, the account manager 320 can change a state of the user account, for example, from a good state to a potentially compromised state, assign a new salt key to the user account, and send a notification to the account owner. The notification can request the sender to acknowledge receipt of the notification. For example, the notification can request the sender to configure a client message application with the new salt key, to create a new account password, etc. The notification can also include data that indicates the user account has been assigned a new salt key, the number of spam reports that are associated with the sender's user account, when the spam reports were received, the message-salt verification servers that submitted the spam reports, etc. The account manager 320 can receive an acknowledgement from the sender and can change the state of the sender's user account back to a good state. The account manager 320 can also reset the current number of spam reports that are associated with sender's user account to a default value, such as a zero value. A benefit in assigning a new salt key to the user account is that the salt key that was included in the spam messages sent by the spammer will no longer be valid, and when a recipient attempts to verify an electronic message sent by the spammer, the verification result can indicate that the message is potential spam.

Figure 4:
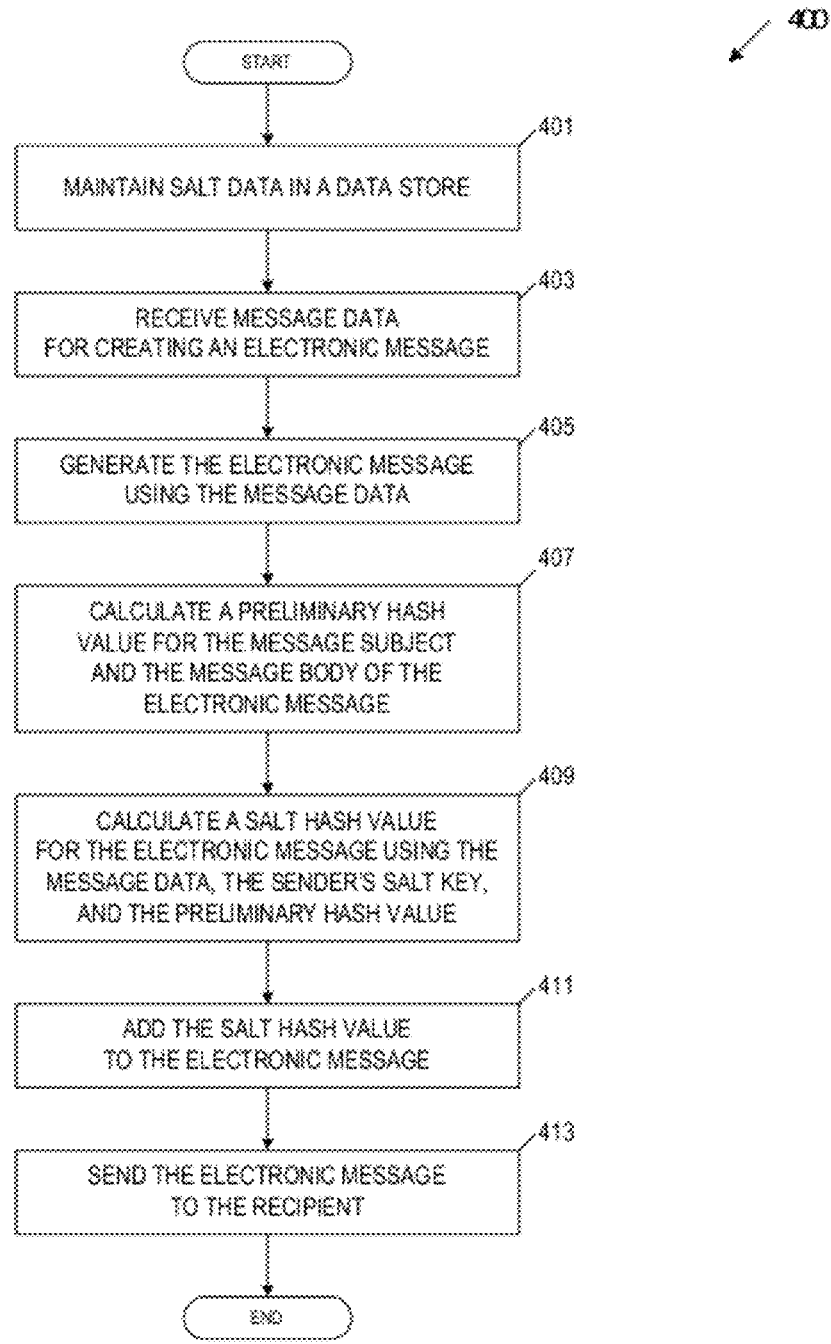
FIG. 4 is a flow diagram of an embodiment of a method for creating an electronic message that includes a message salt for verifying the authenticity of a sender of the electronic message.

FIG. 4 is a flow diagram of an embodiment of a method 400 for creating an electronic message that includes a salt hash value (message salt) for verifying the authenticity of a sender of the electronic message. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the message-salt agent system 150 hosted by a client 107A,B of FIG. 1. Examples of electronic messages can include, and are not limited to, electronic mail messages (email messages), instant messages, newsgroup messages, forum messages, mobile text messages, online gaming messages, social networking messages, blog messages, and other similar electronic messages. For brevity and simplicity, email message, email service provider, email provider, mail server, mail service, mail domain, and client email application are used as examples throughout this document.

A sender user can use a client hosting a message-salt agent system to generate an electronic message, add a salt hash value (e.g., in a salt header) to the electronic message, and send the electronic message to a recipient. In one embodiment, the method 400 starts with the message-salt agent system maintaining salt data in a data store that is coupled to the message-salt agent system at block 401. The salt data can include a key (salt key) for the sender for generating message salt for an electronic message. At block 403, the message-salt agent system receives message data for creating the electronic message. The message data can be received as user input via a user interface. Alternatively, the message data can be data that is already stored in a data store that is coupled to the message-salt agent system. The message data 245 can include a sender identifier (e.g., a sender's FROM message address), a REPLY-TO message address, To message addresses, CC message addresses, a DATE added by the sender's client message application or message service, data for a message subject and a message body of the electronic message, etc., or any combination of the above, as well as other data.

At block 405, the message-salt agent system generates an electronic message using the message data and calculates a preliminary hash value (inner hash value) for the electronic message at block 407. A preliminary hash value is a hash of the message subject and the message body data of the electronic message. The message-salt agent system can remove whitespace characters from the message subject and the message body data and can normalize the message subject and the message body by reverting message transport encoding (e.g., MIME Quoted-Printable encoding) and generate the inner hash value. At block 409, the message-salt agent system calculates a salt hash value for the electronic message using the salt key for the sender, the inner hash value, and at least some of the message data (e.g., sender FROM message address, REPLY-TO message address, all TO and CC message addresses, a date). The message-salt agent system adds the salt hash value to the electronic message at block 411. For example, the message-salt agent system adds a message header, such as an email header, that includes the salt hash value to the electronic message. At block 413, the message-salt agent system sends the electronic message to the recipient. The following is an example salt header containing a salt hash value.

X-MessageSalt-Hash-SHA-256: \12991aca22970ac05f2e 8a27de16afdcd41780c3be66f9cc09911604e7b420a6

Figure 5:
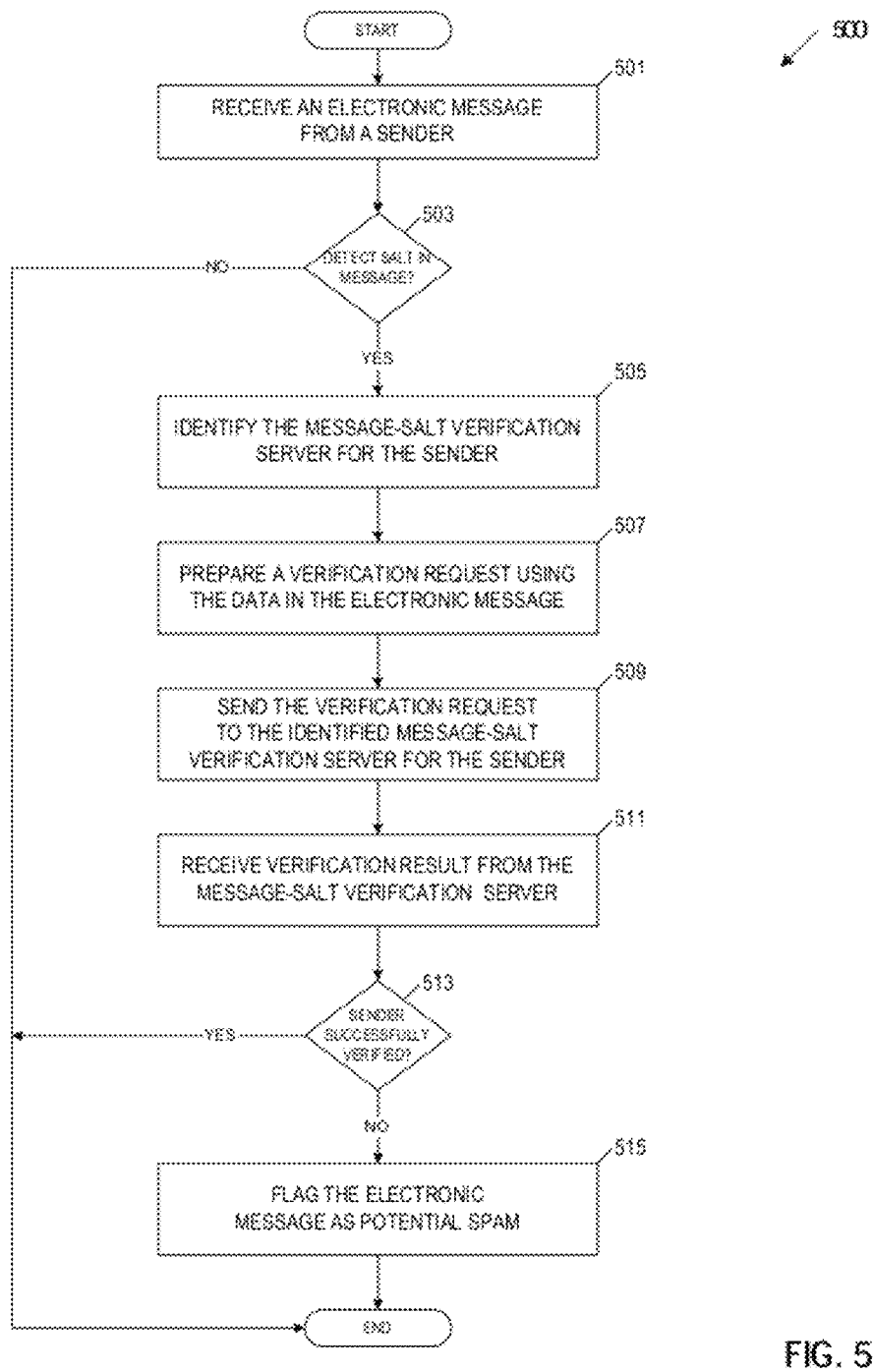
FIG. 5 is a flow diagram of an embodiment of a method for using message salt for verifying the authenticity of a sender of an electronic message.

FIG. 5 is a flow diagram of an embodiment of a method 500 for using message salt for verifying the authenticity of a sender of an electronic message. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the message-salt agent system 150 hosted by a client 107A,B of FIG. 1. Examples of electronic messages can include, and are not limited to, electronic mail messages (email messages), instant messages, newsgroup messages, forum messages, mobile text messages, online gaming messages, social networking messages, blog messages, and other similar electronic messages. For brevity and simplicity, email message, email service provider, email provider, mail server, mail service, mail domain, and client email application are used as examples throughout this document.

A user can use a client hosting a message-salt agent system to receive an electronic message from a sender and attempt to verify the authenticity of the sender of the electronic message using the message-salt agent system. In one embodiment, the method 500 starts with the message-salt agent system hosted by a recipient client receiving an electronic message at block 501. At block 503, the recipient message-salt agent system determines whether there is a salt hash value (e.g., a salt hash value in a salt header) in the electronic message. If there is a salt hash value (e.g., a salt header) in the electronic message, the recipient message-salt agent system determines a message-salt verification server that is associated with the sender of the electronic message at block 505. The recipient message-salt agent system identifies a message domain, such as a mail domain, for the sender from a sender identifier in the electronic message and uses the message domain to query a DNS server to determine the sender message-salt verification server. An example of a sender identifier is a sender's email address. For example, User_A@gmail.com sends an email message to a recipient User_B@redhat.com. The recipient message-salt agent system identifies the sender's mail domain as gmail.com and queries a DNS server for the message-salt verification server that manages the gmail.com mail domain. The DNS server can store message-salt discovery data (e.g., 'MSALT' type DNS records) that maps one or more message domains to message-salt verification servers. For example, the DNS can return a result to the message-salt agent system identifying a message-salt verification server having a host name of 'messagesalt.gmail.com' as the message-salt verification server that manages the gmail.com mail domain.

At block 507, the recipient message-salt agent system prepares a verification request using the data in the electronic message and sends the verification request to the message-salt verification server that is associated with the sender at block 509. A verification request can include a sender identifier (e.g., a sender's FROM message address), a REPLY-TO message address, To message addresses, CC message addresses, a DATE added by the sender's client message application or message service, a preliminary hash value (an inner hash value) generated by the recipient message-salt agent system, a salt hash value which a sender included in the electronic message to a recipient, etc., or any combination of the above, as well as other data. In one embodiment, a recipient message-salt verification server acts as a proxy for the recipient client, and the message-salt agent system sends the verification request to the recipient message-salt verification server, which then forwards the verification request to the sender message-salt verification server. To generate the preliminary hash value, the recipient message-salt agent system can remove whitespace characters from the message subject and the message body data and can normalize the message subject and the message body by reverting message transport encoding (e.g., MIME Quoted-Printable encoding) and generate the inner hash value.

The sender message-salt verification server can receive the verification request and send a verification result to the recipient client. At block 511, the message-salt agent system receives the verification result from the sender message-salt verification server. In one embodiment, a recipient message-salt verification server acts as a proxy for the recipient client, and the message-salt agent system receives the verification result from the recipient message-salt verification server. At block 513, the message-salt agent system determines whether the sender is successfully verified as an authentic sender. The verification result can include data that indicates whether the sender has been successfully verified or whether the sender has not been successfully verified. A successful result can indicate to the recipient of an electronic message that the combination of sender, recipients, date, message subject, message body, etc. was authentically produced by the owner of the sender's user account, unless the sender's user account has been compromised, and the compromise hasn't yet been detected.

If the sender is not successfully verified as an authentic sender (block 513), the message-salt agent system can identify the electronic message as potential spam at block 515. A recipient client can use the verification result to filter the electronic message. Electronic messages from senders that can't be verified can be sorted as potential spam. For example, the message-salt agent system can place the electronic message in a spam folder, can flag the electronic message with an indicator that the electronic message is potential spam, can display a message indicating the electronic message is potential spam when a user attempts to open the electronic message, etc.

Figure 6:
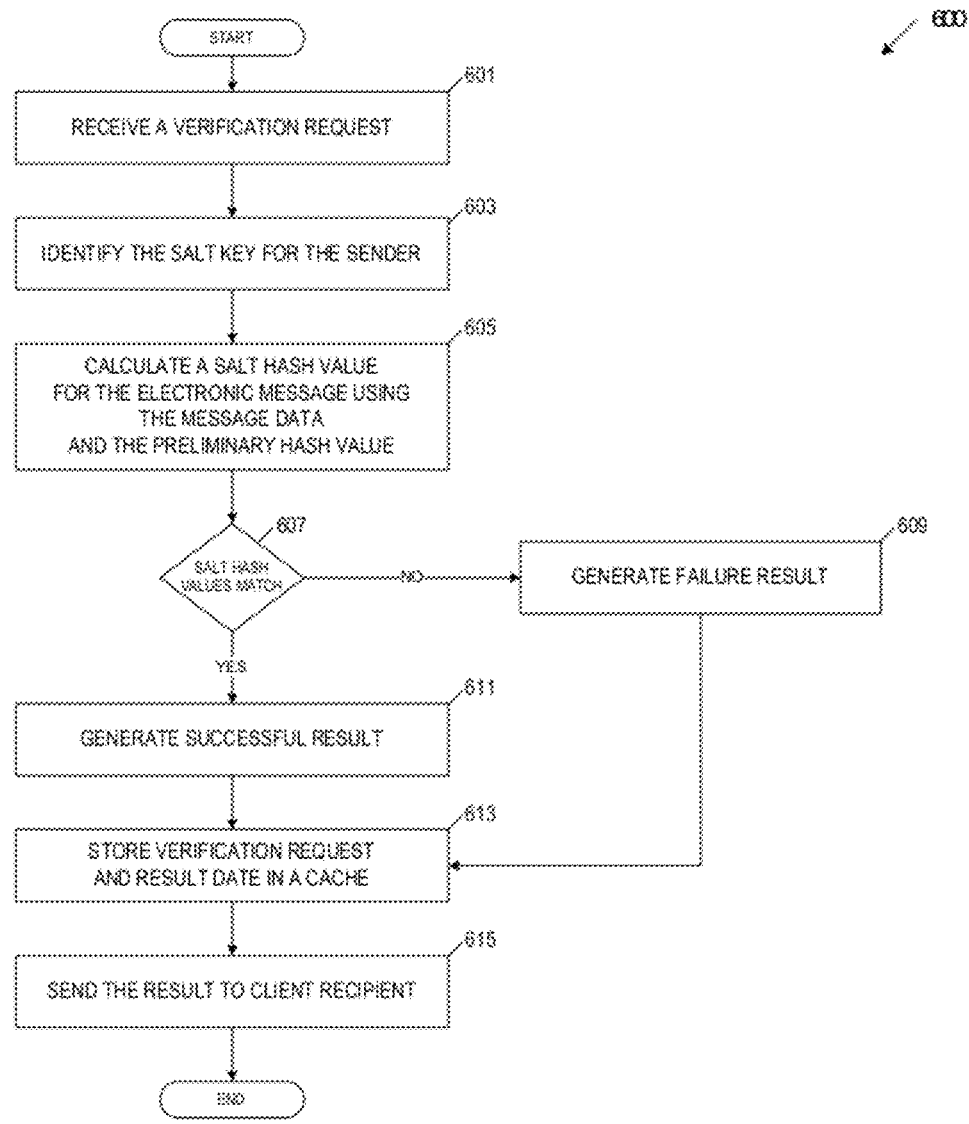
FIG. 6 is a flow diagram of an embodiment of a method for using message salt for verifying the authenticity of a sender of an electronic message.

FIG. 6 is a flow diagram of an embodiment of a method 600 for using message salt for verifying the authenticity of a sender of an electronic message. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the message-salt verification system 140 hosted by a server 115A,B of FIG. 1. Examples of electronic messages can include, and are not limited to, electronic mail messages (email messages), instant messages, newsgroup messages, forum messages, mobile text messages, online gaming messages, social networking messages, blog messages, and other similar electronic messages. For brevity and simplicity, email message, email service provider, email provider, mail server, mail service, mail domain, and client email application are used as examples throughout this document.

A user can use a client and/or message server hosting a message-salt agent system to prepare a verification request and send it to a message-salt verification server that is associated with the sender of the electronic message. In one embodiment, the method 600 starts with a message-salt verification system hosted by a message-salt verification server, which is associated with the sender, receiving a verification request at block 601. The message-salt verification system that is hosted by the sender message-salt verification server is herein referred to as the sender message-salt verification system. The verification request can include a sender identifier (e.g., a sender's FROM message address), a REPLY-TO message address, To message addresses, CC message addresses, a DATE added by the sender's client message application or message service, an inner hash value generated by a recipient message-salt agent system, a salt hash value which a sender included in the electronic message to a recipient, etc., or any combination of the above, as well as other data.

At block 603, the sender message-salt verification system identifies the salt key for the sender. The sender message-salt verification system can use the sender identifier in the verification request to look up a salt key that is associated with the sender identifier in salt data that is stored in a data store that is coupled to the sender message-salt verification system. The salt data can include sender identifiers (e.g., a sender's FROM message address) and salt keys for the senders. At block 605, the sender message-salt verification system calculates a salt hash value for the electronic message using the salt key for the sender, the inner hash value in the verification request, and at least some of the data in the verification request (e.g., sender FROM message address, REPLY-TO message address, all TO and CC message addresses, a date). The sender message-salt verification system can use a hash algorithm, such as SHA-256, for calculating the salt hash value.

At block 607, the sender message-salt verification system determines whether the generated salt hash value matches the salt hash value received in the verification request. If the values do not match, the sender message-salt verification system generates a verification result indicating that the sender is not verified at block 609, and can store the result data in a cache at block 613. If the values match (block 607), the sender message-salt verification system generates a verification result that indicates that the sender is successfully verified at block 611. A successful result can indicate to the recipient of an electronic message that the combination of sender, recipients, date, message subject, message body, etc. was authentically produced by the owner of the sender's user account.

At block 613, the sender message-salt verification system can optionally store the verification request and the result data in a cache. The result data can indicate whether the sender was successfully or unsuccessfully verified. For example, an electronic message may be sent by a sender to multiple recipients.

The sender message-salt verification system can be optimized by storing the verification request and result data for the verification request in a cache that can be quickly accessed upon receiving future verification request for the same electronic message. At block 615, the sender message-salt verification system sends the verification result to the client recipient. In one embodiment, a recipient message-salt verification server acts as a proxy for the recipient client, and the sender message-salt verification system sends the result to the recipient message-salt verification server, which then forwards the result to the client.

Figure 7:
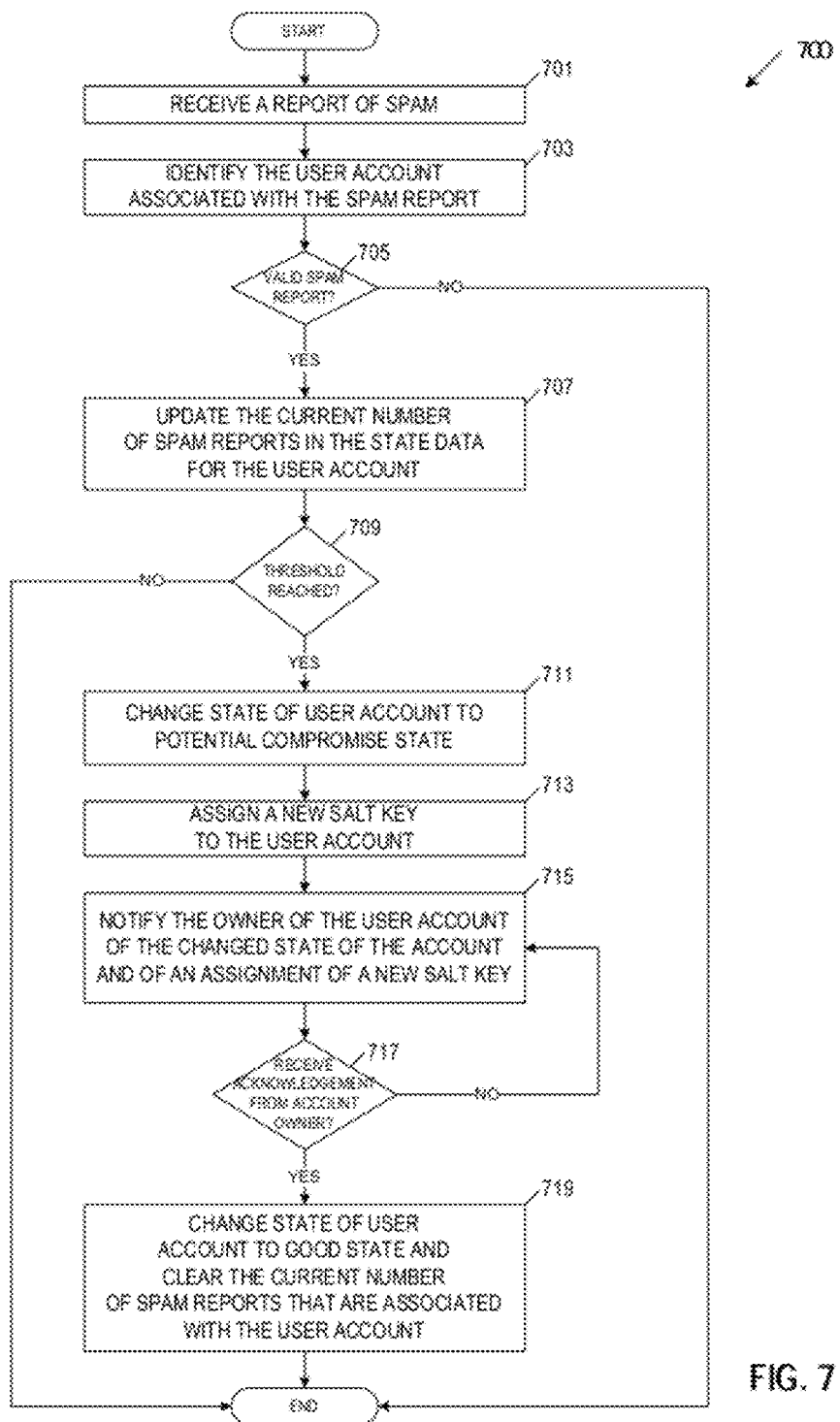
FIG. 7 is a flow diagram of an embodiment of a method for processing a spam report.

FIG. 7 is a flow diagram of an embodiment of a method 700 for processing a spam report. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the message-salt verification system 140 hosted by a server 115A,B of FIG. 1. The message-salt verification system can store and maintain state data for a sender in the data store that is coupled to the message-salt verification system. The state data indicates a current state of a user account. Example states can include a good state, a potentially compromised state, etc., as well as other states. The state data can include sender identifiers for message senders, the state of a sender's user account, and a current number of spam reports that are associated with a user account. A user can use a client and/or a message server hosting a message-salt agent system to prepare a spam report and send the spam report to a message-salt verification server that is associated with the sender of the electronic message. In one embodiment, a recipient message-salt verification server acts as a proxy for the recipient client, and the recipient client sends the spam report to the recipient message-salt verification server, which then forwards the spam report to the sender message-salt verification server.

In one embodiment, the method 700 starts with a message-salt verification system hosted by a message-salt verification server, which is associated with the sender, receiving a spam report at block 701. In one embodiment, a recipient message-salt verification server acts as a proxy for the recipient client, and the sender message-salt verification system received the spam report from a recipient message-salt verification server. The spam report can include a sender identifier (e.g., a sender's FROM message address), a REPLY-TO message address, To message addresses, CC message addresses, a DATE added by the sender's client message application or message service, data for a message subject and a message body of the electronic message, the preliminary hash value (inner hash value), salt hash value (outer hash value), etc., or any combination of the above, as well as other data.

At block 703, the sender message-salt verification system identifies a user account from the sender identifier in the spam report. At block 705, the sender message-salt verification system uses the data contained in the spam report to validate the spam report against the current salt key that is assigned to the owner of the user account used to send the message. The sender message-salt verification system can use the current salt key that is assigned to the owner of the user account and data contained in the spam report to generate a salt hash value. For example, the sender message-salt verification system can use the inner hash combined with other data in the spam report (e.g., a sender's FROM message address, a REPLY-TO message address, To message addresses, CC message addresses, a DATE added by the sender's client message application or message service) to calculate a salt hash value. If the generated salt hash value does not match the salt hash value contained in the spam report, the spam report is not valid (block 705), and the sender message-salt verification system can ignore the spam report. If the generated salt hash value matches the salt hash value in the spam report, the spam report is valid (block 705), and the sender message-salt verification system updates (increments) the current number of spam reports that are associated with the user account in the state data at block 707.

At block 709, the sender message-salt verification system compares the current number of spam reports to threshold data that is stored in the data store. The threshold data indicates a number of spam reports than can be associated with a particular user account before the sender message-salt verification system can change the state of a user account. If the threshold has been exceeded (block 709), the sender message-salt verification system changes a state of the user account, for example, from a good state to a potentially compromised state, at block 711. At block 713, the sender message-salt verification system assigns a new salt key to the user account and sends a notification to the account owner of the account used to send the electronic message (e.g., email message) at block 715. The notification can also include data that indicates the user account has been assigned a new salt key, the number of spam reports that are associated with the sender's user account, when the spam reports were received, the message-salt verification servers that submitted the spam reports, etc.

The notification can request the owner of the user account used to send the electronic message to acknowledge receipt of the notification. In one embodiment, an acknowledgement can be required before the messaging account can be used again for sending messages, before being able to access the new message-salt key, and/or before being able to set a new account password. Because an attacker might currently have full control over a user account, in one embodiment, the sender message-salt verification system can require an account owner to provide additional proof of identification before the acknowledgement is accepted (e.g. by correctly answering a previously defined security question, or by authenticating using a non-electronic mechanism, such as calling a technical support person on the phone). At block 717, the sender message-salt verification system determines whether an acceptable acknowledge from the sender has been received. If an acceptable acknowledgement has not been received (block 717), the sender message-salt verification system can send the sender another notification. The sender message-salt verification system can wait a period of time (e.g., 24 hours) before sending another notification to the sender. The period of time can be a parameter stored in the data store. The time period can be a user-defined parameter. If an acceptable acknowledgement has been received (block 717), the sender message-salt verification system changes the state of the sender's user account back to a good state and resets the current number of spam reports that are associated with sender user account to a default value, such as a zero value, at block 719. When an acceptable acknowledgement has been received, the sender message-salt verification system can request the account owner to configure a client message application with the new salt key, to create a new user account password, etc.

Figure 8:
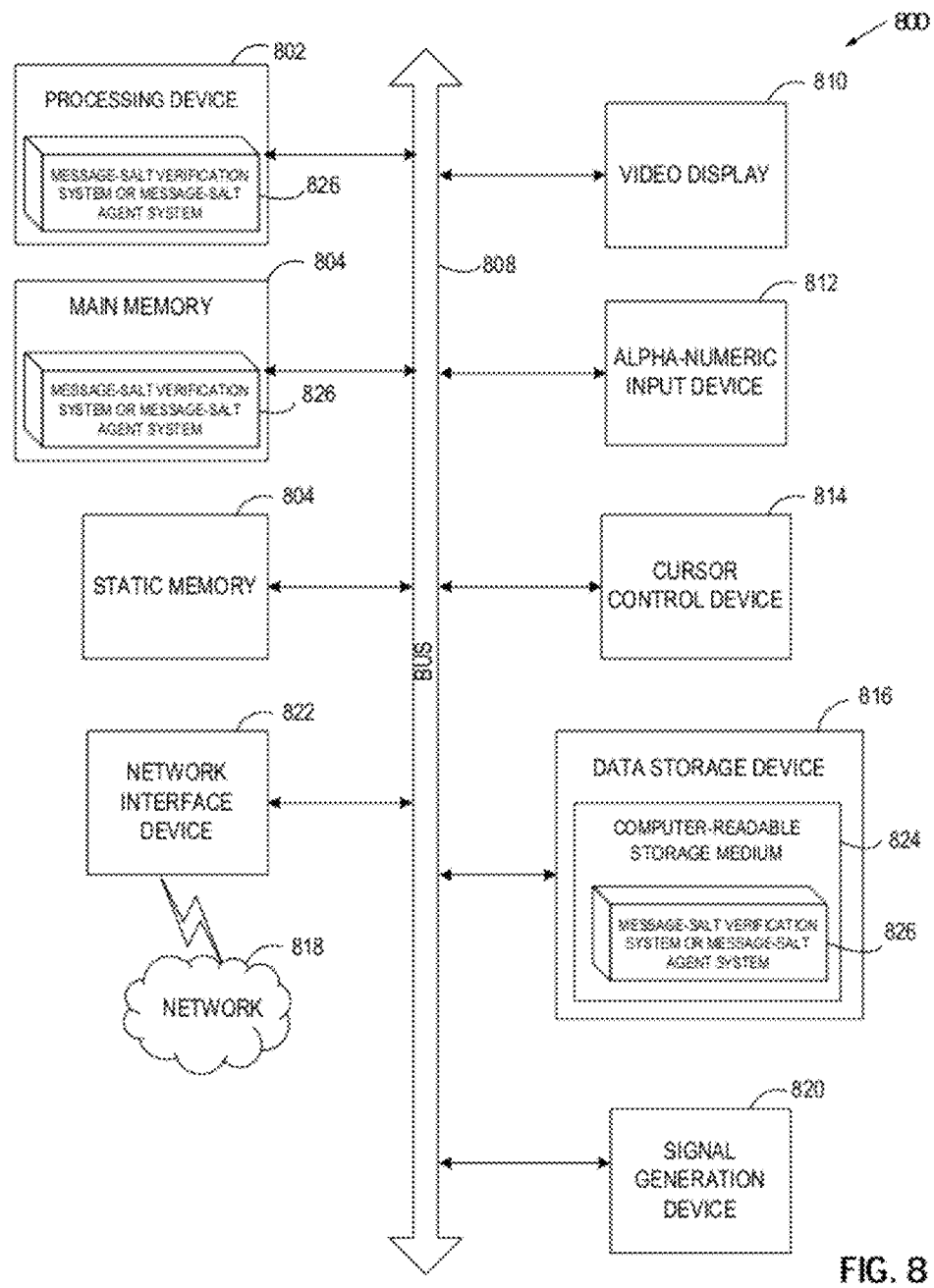
FIG. 8 is a diagram of one embodiment of a computer system for using message salt for verifying the authenticity of a sender of an electronic message.

FIG. 8 is a diagram of one embodiment of a computer system for using message salt for verifying the authenticity of a sender of an electronic message. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the message-salt verification system or message-salt agent system 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the message-salt verification system or message-salt agent system 826) embodying any one or more of the methodologies or functions described herein. The message-salt verification system or message-salt agent system 826 may also reside, completely or at least partially, within the main memory 804 and/or within the processing device 802 during execution thereof by the computer system 800, the main memory 804 and the processing device 802 also constituting machine-readable storage media. The message-salt verification system or message-salt agent system 826 may further be transmitted or received over a network 818 via the network interface device 822.

The computer-readable storage medium 824 may also be used to store the message-salt verification system or message-salt agent system 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The message-salt verification system or message-salt agent system 826, components and other features described herein (for example in relation to FIG. 1) can be implemented as discrete hardware components or integrated in the functionality of hardware components such as ASICS, FPGAs, DSPs or similar devices. In addition, the an message-salt verification system or message-salt agent system 826 can be implemented as firmware or functional circuitry within hardware devices. Further, the message-salt verification system or message-salt agent system 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "identifying," "generating," "determining," "sending," "storing," "changing," "assigning," "notifying," "querying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically generating code for using message salt for verifying the authenticity of a sender of an electronic message. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving a verification request from a recipient of an electronic message to verify authenticity of a sender of the electronic message, the verification request comprising message data of the electronic message and a first salt hash value;
    identifying a key associated with the sender;
    generating, by a processing device, a second salt hash value using the key and the message data;
    responsive to determining, by the processing device, that the first salt hash value matches the second salt hash value, sending a verification to the recipient;
    receiving a spam report associated with the sender, the spam report comprising a third salt hash value;
    responsive to determining, by the processing device, that the third salt hash value matches the second salt hash value, increasing a number of valid spam reports associated with the sender; and
    responsive to determining, by the processing device, that the number of valid spam reports associated with the sender exceeds a threshold, assigning a new key to the sender.

2. The method of claim 1, further comprising:
    storing salt data comprising a sender identifier for the sender and the key in association with the sender identifier.

3. The method of claim 1, further comprising:
    storing state data for a user account that is associated with the sender indicating a state of the user account and the number of valid spam reports associated with the sender;
    changing the state of the user account based on the determination that the number of valid spam reports associated the sender exceeds the threshold; and
    notifying the sender of the changed state of the user account and the new key.

4. The method of claim 1, wherein the message data comprises a sender identifier, a reply-to message address, a TO message address, a CC message address, a date, and message body data of the electronic message.

5. The method of claim 1, wherein sending the verification to the recipient comprises:
    sending the verification to a server that is associated with the recipient, wherein the recipient server is a proxy to forward the verification to the recipient.

6. The method of claim 1, wherein receiving the verification request comprises receiving the verification request over a network.

7. The method of claim 1, wherein the message data of the electronic message comprises a TO message address associated with the recipient of the electronic message and a FROM message address associated with the sender of the electronic message.

8. A system comprising:
    a memory; and
    a processing device operatively coupled to the memory, the processing device to:
        receive a verification request from a recipient of an electronic message to verify authenticity of a sender of the electronic message, the verification request comprising message data of the electronic message and a first salt hash value;
        identify a key associated with the sender;
        generate a second salt hash value using the key and the message data;
        responsive to determining that the first salt hash value matches the second salt hash value, send a result verification to the recipient;
        receive a spam report associated with the sender, the spam report comprising a third salt hash value;
        responsive to determining that the third salt hash value matches the second salt hash value, increasing a number of valid spam reports associated with the sender: and
        responsive to determining that the number of valid spam reports associated with the sender exceeds a threshold, assigning a new key to the sender.

9. The system of claim 8, wherein the memory is to store state data for a user account that is associated with the sender indicating a state of the user account and number of valid spam reports associated with the sender, and wherein the processing device is further to:
    change the state of the user account based on the determination that the number of valid spam reports associated with the sender exceeds the threshold; and
    notify the sender of the changed state of the user account and the new key.

10. The system of claim 8, wherein the processing device is to send the verification to the recipient by:
    sending the verification to a server that is associated with the recipient, wherein the recipient server is a proxy to forward the verification to the recipient.

11. The system of claim 8, further comprising a network interface, wherein the processing device is coupled to the network interface and is to receive the verification request via the network interface.

12. A non-transitory computer-readable medium having instructions encoded thereon that, when executed by a processing device, cause the processing device to perform operations comprising:

receiving a verification request from a recipient of an electronic message to verify authenticity of a sender of the electronic message, the verification request comprising message data of the electronic message and a first salt hash value;
 identifying a key associated with the sender;
 generating, by the processing device, a second salt hash value using the key and the message data;
 responsive to determining, by the processing device, that the first salt hash value matches the second salt hash value, sending a verification to the recipient;
 receiving a spam report associated with the sender, the spam report comprising a third salt hash value;
 responsive to determining, by the processing device, that the third salt hash value matches the second salt hash value, increasing a number of valid spam reports associated with the sender; and
 responsive to determining, by the processing device, that the number of valid spam reports associated with the sender exceeds a threshold, assigning a new key to the sender.

13. The non-transitory computer-readable medium of claim 12, the operations further comprising:

storing state data for a user account that is associated with the sender indicating a state of the user account and the number of valid spam reports associated with the sender;
 changing the state of the user account based on the determination that the number of valid spam reports associated with the sender exceeds the threshold; and
 notifying the sender of the changed state of the user account and the new key.

14. The non-transitory computer-readable medium of claim 12, wherein sending the verification to the recipient comprises:

sending the verification to a server that is associated with the recipient, wherein the recipient server is a proxy to forward the verification to the recipient.

15. The non-transitory computer-readable medium of claim 12, wherein receiving the verification request comprises receiving the verification request over a network.

\* \* \* \* \*